(12) United States Patent
Meredith et al.

(10) Patent No.: US 7,013,525 B1
(45) Date of Patent: Mar. 21, 2006

(54) WIPER BLADE FOR GLASS SURFACES

(76) Inventors: Jerry R. Meredith, 228 Baltusrol Rd., Knoxville, TN (US) 37922; Donna Sue Meredith, 228 Baltusrol Rd., Knoxville, TN (US) 37922

( * ) Notice: Subject to any disclaimer, the term of this patent is extended or adjusted under 35 U.S.C. 154(b) by 7 days.

(21) Appl. No.: 10/962,306

(22) Filed: Oct. 8, 2004

Related U.S. Application Data (63) Continuation-in-part of application No. 10/946,662, filed on Sep. 22, 2004.

(51) Int. Cl.
*B60S 1/28* (2006.01)
*B60S 1/38* (2006.01)

(52) U.S. Cl. .................................. 15/250.41; 15/250.4

(58) Field of Classification Search .............. 15/250.4, 15/250.41, 250.48, 250.202, 250.361, 103, 15/245
See application file for complete search history.

(56) References Cited

U.S. PATENT DOCUMENTS 3,089,175 A * 5/1963 Hinder .................... 15/250.43
5,778,483 A * 7/1998 Dawson ................... 15/250.04
5,996,168 A * 12/1999 Watkins ..................... 15/250.4
6,763,546 B1 * 7/2004 Smith ...................... 15/250.04

FOREIGN PATENT DOCUMENTS

| DE | 2700527 | * | 9/1978 |
| DE | 3934203 | * | 4/1991 |
| WO | 80/01155 | * | 6/1980 |

* cited by examiner

*Primary Examiner*—Gary K. Graham
(74) *Attorney, Agent, or Firm*—Michael E. McKee (57) ABSTRACT

A wiper blade for cleaning the surface of glass in a vehicle utilizes a wiper-providing body including a spine portion and a wiping element for engaging the surface of glass to be cleaned and an elongated cleaning element which is mounted for movement relative to the spine portion. Juxtaposed magnetic devices are secured within the spine portion and the cleaning element for biasing the cleaning element away from the spine portion of the wiper-providing portion so that during use of the wiper blade, the cleaning element is biased toward the glass surface by the repelling forces of the magnetic devices and is maintained in a spaced relationship with the spine portion so that during use of the wiper blade, the cleaning element is permitted to shift in position relative to the wiper-providing element and the spine portion.

20 Claims, 5 Drawing Sheets

WIPER BLADE FOR GLASS SURFACES

This is a continuation-in-part of application Ser. No. 10/946,662 filed Sep. 22, 2004 and entitled WIPER BLADE FOR GLASS SURFACES AND ASSOCIATED METHOD OF MAKING, the disclosure of which is incorporated herein by reference.

BACKGROUND OF THE INVENTION

This invention relates generally to vehicle parts and accessories and relates, more particularly, to wiper blades used for cleaning glass surfaces of vehicles and methods of making such blades.

Conventional wiper blades used for wiping glass surfaces of vehicles have heretofore been constructed of a smooth, flexible material, such as rubber, which is intended to clean the glass surface as the wiper blade passes repeatedly back and forth across the glass surface. However, some substances (such as bugs or bird dropping) which occasionally come into contact with the glass surfaces of a vehicle are difficult for common wiper blades to remove. It would therefore be desirable to provide an improved wiper blade which is capable of removing hard-to-remove substances from the glass surface of a vehicle—whether the glass is dry or wetted.

Accordingly, it is an object of the present invention to provide a new and improved wiper blade which is capable of removing hard-to-remove material from the glass surfaces of a vehicle more easily than does conventional wiper blades and a method of making the wiper blade. Exemplary applications for such a wiper blade include the windshield and other glass surfaces (such as headlamps) of commercial and private vehicles including, but not limited to, automobiles, trucks, aircraft, boats, construction and farm machinery, and motorcycles.

Another object of the present invention is to provide such a wiper blade which is capable of cleaning glass surfaces of a vehicle with fewer back and forth passes than would otherwise be required with a wiper blade of conventional construction and which is capable of cleaning glass surfaces whether the glass surfaces are in a dry or wetted condition.

Still another object of the present invention is to provide such a wiper blade which embodies a material for brushing hard-to-remove material from the glass surface of a vehicle.

Yet another object of the present invention is to provide such a wiper blade which be used to clean the glass surfaces, such as windshield or lamp surfaces, on any of a number of vehicles.

A further object of the present invention is to provide such a wiper blade which, when used for cleaning a windshield, helps to maintain the glass surface is a relatively clean condition and thereby enhance visibility through the windshield glass.

A further object of the present invention is to provide such a wiper blade which is uncomplicated in structure, yet effective in operation.

SUMMARY OF THE INVENTION

This invention resides in a wiper blade having an elongated wiper-providing body including a spine portion and a wiping element extending from the spine portion for engaging and wiping glass as the wiper blade is moved thereacross and wherein the wiper-providing body includes a longitudinal axis.

The improvement includes an elongated cleaning element for cleaning the glass with the wiping element as the wiper blade is moved across the glass. The cleaning element is joined to the wiper-providing body to permit longitudinal movement of the cleaning element relative thereto and to permit movement of the cleaning element relative to the wiper-providing body toward and away from the spine portion as the wiper blade is moved across the glass. In addition, a magnetic device is joined to the wiper-providing portion for biasing the cleaning element away from the spine portion of the wiper-providing portion so that upon placing the wiping element and the cleaning element into engagement with the surface of the glass to be cleaned, the cleaning element is biased toward the glass surface by the forces of the magnetic device exerted upon the cleaning element and is maintained in a spaced relationship with the spine portion so that as the wiper blade is moved across the glass surface, the cleaning element is permitted to move relative to the wiper-providing element and the spine portion as aforesaid.

DETAILED DESCRIPTION OF ILLUSTRATIVE EMBODIMENTS

Figure 1:
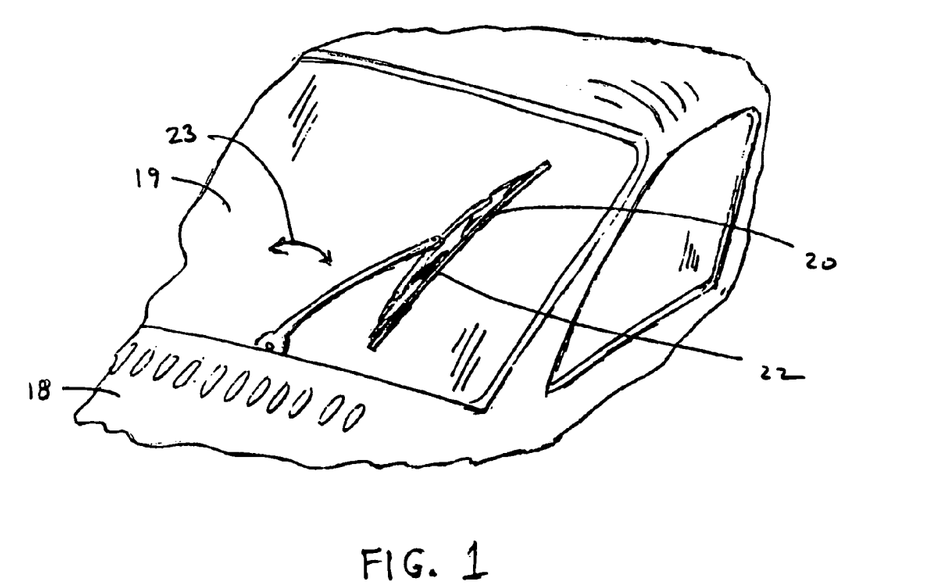
FIG. 1 is a perspective view of a vehicle and a wiper blade assembly shown utilized for cleaning the windshield glass of the vehicle wherein the wiper blade assembly includes a wiper blade which embodies features of the present invention.

Turning now to the drawings in greater detail and considering first FIG. 1, there is illustrated a vehicle 18 having a windshield 19 and a windshield wiper blade assembly 20 for cleaning, or wiping, the windshield 19 as the assembly 20 is passed back and forth across the glass surface of the windshield 19 in the directions indicated by the arrow 23. Embodied within the wiper blade assembly 20 is a wiper blade 22 which incorporates features of the present invention and which engages the surface of the windshield during use. As will be apparent herein, the wiper blade 22 includes cleaning elements, described herein, which clean the windshield surface as the assembly 20 is passed back and forth across the windshield 19.

Figure 2:
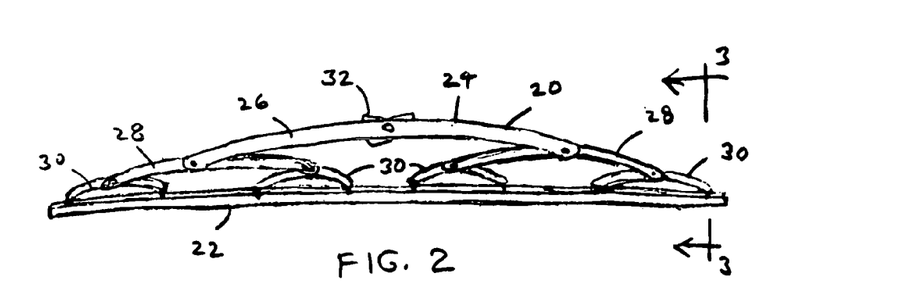
FIG. 2 is a side elevational view of a major portion of the wiper blade assembly of FIG. 1.

With reference to FIG. 2, the windshield wiper blade assembly 20 includes an arm assembly 24 including a plurality of linkage members, described herein which are joined together in a manner known in the art to permit the linkage members to pivot relative to one another about the midpoints thereof. Such linkage members include a main member 26, two secondary members 28 are pivotally joined to the ends of the main member 26 and four tertiary members 30 which are pivotally joined to the ends of the secondary members 28. In addition, the wiper blade assembly 20 includes attachment means in the form of a clip 32 which accommodates the attachment to (and detachment from) the arm, indicated 21 in FIG. 1, of a windshield wiper of the vehicle windshield 19.

Figure 3:
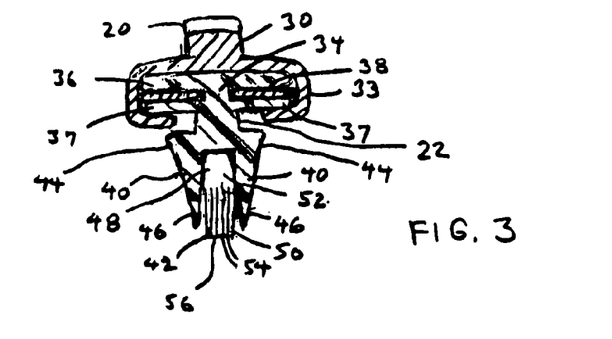
FIG. 3 is a view of a transverse cross section of the wiper blade of FIG. 1 taken generally along line 3—3 of FIG. 4.

Associated with each end of the tertiary members 30 is a channel member 33 (best shown in FIG. 3) positionable about a portion (as shown in FIG. 3) of the wiper blade 22. Collectively, the channel members 33 provide a guide channel into a portion of the wiper blade 22 can be inserted endwise and subsequently secured for attaching the blade 22 to the remainder of the wiper blade assembly 22. In this connection, the wiper blade 22 includes a spine portion 34 (best shown in FIG. 3) which extends longitudinally of the blade 22 and has outwardly extending rib sections 36, 37 which are slidably positioned within the guide channel formed by the channel members 33 of the tertiary members 30. The spine portion 34 can be reinforced (against bending and compression forces) with a thin metal strip 38 which includes a central slit for accepting the mid-section of the spine portion 34 disposed between the rib sections 36, 37.

It is a feature of the depicted wiper blade 22 that it includes a brush element and at least one rubber element which are joined together in a unitary structure. For example and with reference to FIG. 2, the depicted wiper blade 22 includes a pair of rubber elements 40 between which is sandwiched a brush element 42. Each rubber element 40 includes a proximal end portion 44 which is joined to the spine portion 34 along the length thereof and a distal end portion 46 which extends away from the spine portion 34. Similarly, the brush element 42 includes a proximal end portion 48 which is joined to the spine portion 34 and a distal end portion 50 which extends away from the spine portion 34.

Associated with the proximal end portion 48 of the brush element 42 is a body 52, and there is associated with the distal end portion 50 of the brush element 42 a plurality of straight bristles 54 which are joined at one end to the body 52 and have opposite, or free, ends 56 which extend from the body 52.

The brush element 42 (comprised of both the body 52 and brush element 54) is constructed of Nylon or another copolymer material suitable for brushing (e.g. in a brushing or scrubbing action) the surface of glass when the brush element 42 is moved thereacross and which possesses a relatively high resistance to wear to thereby enhance the usable life of the brush element 42. Furthermore, the brush element 42 is incapable of absorbing water or other fluids to help prevent mold growth in or around the brush element 42.

With reference still to FIG. 3, the proximal end portion 44 of each rubber element 40 has a width which is slightly larger than the more-pointed distal end 46 to provide the transverse cross-sectional shape of each rubber element 40 with a tapered form. Each rubber element 40 is constructed of a soft rubber-like material (such as rubber or a synthetic rubber used in conventional wiper blade refills) which is resistant to wear yet suitable for wiping the surface of glass clean when wiped thereacross. Accordingly and as used herein, the term "rubber" used in the phrase "rubber element" is intended to encompass all rubber-like substances, and not just natural rubber.

Preferably and to facilitate construction of the wiper blade 22, both of the rubber elements 40 and the spine portion 34 are formed (e.g. molded) as a single piece so that the rubber-like material which comprises the rubber elements 40 is the same as the material which comprises the spine portion 34.

To join the brush element 42 to the remainder of the wiper blade 22 (comprised, in particular, a single piece including both of the rubber elements 40 and the spine portion 34, the body 52 of the brush portion 42 is directed between the rubber elements 40 so that the body 52 abuts the spine portion 34 and so that the free ends 56 of the brush portion 42 extend out from between the rubber elements 40, and the body 52 of the brush portion 42 is securely attached in place between the rubber elements 40. As exemplified by a wiper blade embodiment 70 of FIG. 4 (having many of the same components as the blade 22 of FIGS. 1–3), such an attachment can be effected by directing a shanked fastener element 60 through the rubber elements 40 and the body 52 adjacent the distal end 46 of the rubber elements 40 at spaced intervals along the length of the blade 22.

Figures 4, 5, 6, 7:
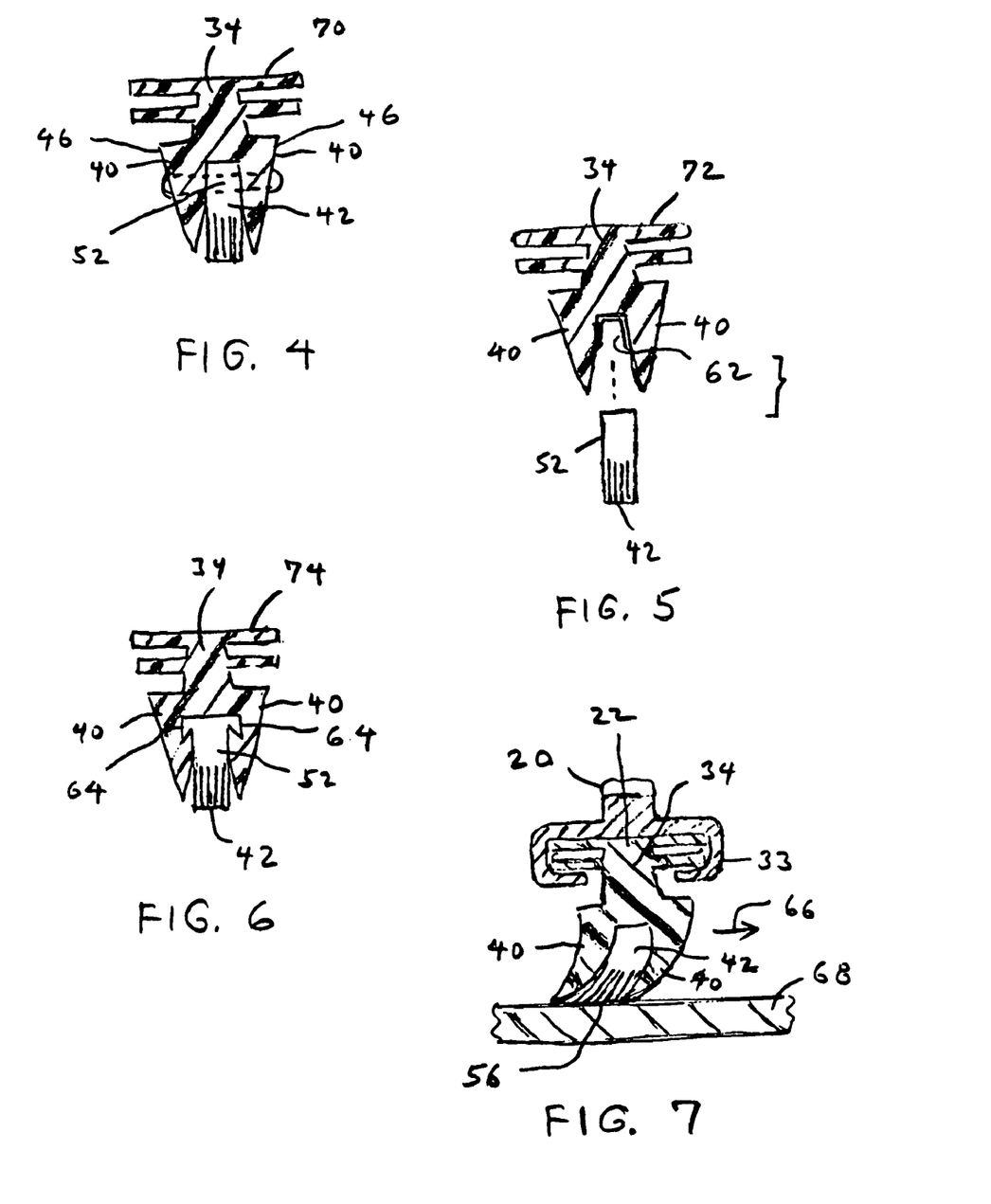
FIG. 4 is a view similar to that of FIG. 3 illustrating another embodiment of a wiper blade.
FIG. 5 is a view similar to that of FIG. 3 illustrating still another embodiment of a wiper blade, shown exploded.
FIG. 6 is a view similar to that of FIG. 3 illustrating yet another embodiment of a wiper blade.
FIG. 7 is a view similar to that of FIG. 3, but showing the blade of FIG. 3 being used to clean the surface of glass.

In the alternative and as exemplified by a wiper blade embodiment 72 of FIG. 5 (having many of the same components as the blade 22 of FIGS. 1–3), a suitable adhesive 62 can be applied along the inside surfaces of the rubber elements 40 adjacent the distal end 46 thereof so that when the body 52 of the brush portion 42 is directed between the rubber elements 40 into abutting relationship with the spine portion 34 and the rubber elements 40 are pressed against the surfaces of the body 52 of the brush portion 42, the brush portion 42 is adhesively secured in place between the rubber elements 40.

As a still further alternative and as exemplified by a wiper blade embodiment 74 of FIG. 6 (having many of the same components as the blade 22 of FIGS. 1–3), the brush portion 42 can be formed in conjunction with the formation of the remainder of the wiper blade 22 (comprising spine portion 34 and both rubber elements 40) in an injection or extruded molding process so that the relative shape of the elements places the elements interlocking relationship. In such an instance, the brush portion 42 is formed in a molding process and then directed between the rubber elements 40 as the remainder of the blade 22 is formed in a molding process. To facilitate the attachment of the brush portion 42 to the remainder of the blade 22, the body 52 of the brush portion 42 can be formed with outwardly-extending ribs, or wings 64 (FIG. 6), which are captured within the walls of the rubber elements 40 as the rubber elements 40 are formed along the opposite sides of the brush portion body 52. With the body 52 thereby captured between the rubber elements 40, the brush portion 42 is interlocked with the rubber elements 40 and resists any unintentional separation of the brush portion 62 from the remainder of the wiper blade 22.

During use and with reference to FIG. 7, the wiper blade 22 is passed sideways (e.g. in the direction of the arrow 66) across the window glass 68 of a vehicle to be cleaned so that the leading rubber element 40 engages the surface of the glass 40 and is followed by, in sequence, the free ends 56 of the brush element 42, and then the trailing rubber element 40 which also engage the surface of the glass. When the wiper blade 22 is reversed in direction across the surface of the glass 68, the leading rubber element 40 becomes the trailing rubber element 40, and vice versa. It has been found that the wiper blade 22, due to its inclusion of the brush portion 42, enhances the glass-cleaning capabilities of the blade 22 and cleans glass surfaces whether the glass surfaces are in a dry or wetted condition. Accordingly, the wiper blade 22 is advantageous in these respects.

The applications for the wiper blade 22 include those in which glass wiper blades are currently in use. Such examples include, but are not limited to, the windshield and other glass surfaces (such as headlamps) of commercial and private vehicles including automobiles, trucks, aircraft, boats, construction and farm machinery, and motorcycles. It also follows that when the wiper blade 22 is used for cleaning a windshield, the blade 22 helps to maintain the surface of the windshield in a relatively clean condition and thereby enhances the visibility through the windshield glass.

It will be understood that although the aforedescribed embodiment 22 has been shown and described as including two rubber elements 40 which are positioned on opposite sides of the brush portion 42, a wiper blade constructed in accordance with the broader aspects of this invention can include only one rubber element.

Furthermore, the aforedescribed wiper blade 22 can be fitted within the channel members 33 (FIG. 3) in a manner which accommodates a movement (e.g. a longitudinal shifting movement) of the blade 22 relative to the wiper blade arm 24 as the blade 22 is passed back and forth across the vehicle glass 19 during use to effect a scrubbing of the glass by the brush element 42. Such a permitted movement of the blade 22 can be effected by providing a central slit within the thin metal strip 38 (about which the channel members 33 are positioned) which is long enough to accommodate the aforedescribed longitudinal shifting of the blade 22 relative to the wiper arm 24. In other words, by providing the blade 22 with the capacity to shift longitudinally relative to the wiper blade arm 24 as the blade 22 is passed back and forth across a glass surface, the likelihood is reduced that each bristle of the brush element 42 follows exactly the same track as it travels back and forth across the glass.

Figure 8:
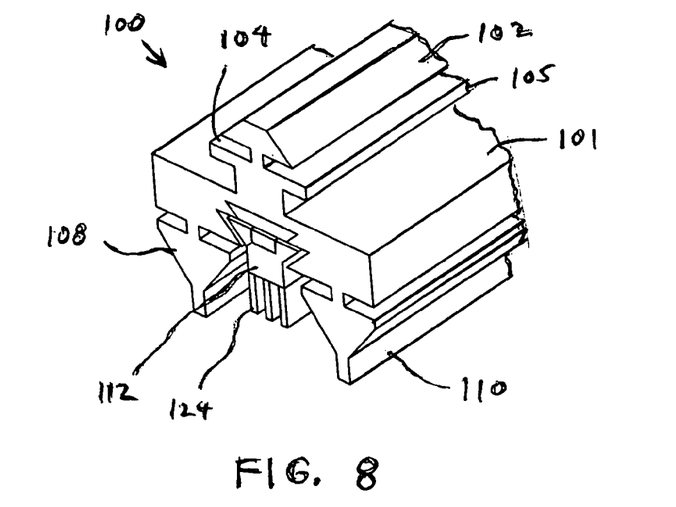
FIG. 8 is a fragmentary perspective view of yet another embodiment of a wiper blade within which features of the present invention are incorporated.
Figure 9:
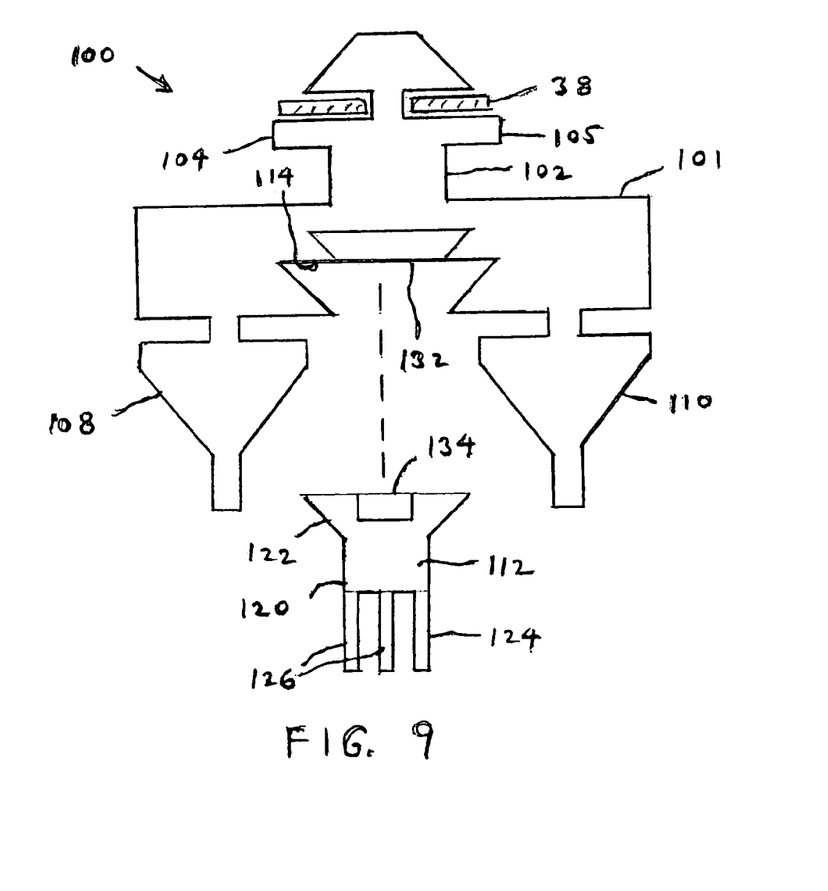
FIG. 9 is a transverse cross-sectional view of the FIG. 8 embodiment, shown exploded.

With reference to FIGS. 8 and 9, there is illustrated still another embodiment, generally indicated 100, within which features of the present invention are embodied. As does the blade 22 of FIGS. 1–7, the blade 100 includes a longitudinally-extending wiper-providing body 101 including a spine portion 102 having outwardly-extending rib sections 104, 105 which can be inserted endwise into a guide channel formed by the channel members 33 (FIGS. 2 and 3) of a wiper blade arm assembly 24 to thereby secure the blade 100 to the assembly 24. Furthermore, the spine portion 102 can be reinforced (against bending and compression forces) with a thin metal strip 38 (FIG. 9) which includes a central slit for accepting the mid-section of the spine portion 102 disposed between the rib sections 104, 105.

The wiper-providing body 101 further includes a pair of rubber wiper elements 108, 110 which are integrally formed with the spine portion 102, and the blade 100 also includes a cleaning element 112 which is captured by a groove 114 formed in the spine portion 102. The groove 114 is positioned centrally between the pair of rubber wiper elements 108, 110 and extends along the wiper elements 108, 110 for the full length thereof. As will be apparent herein, the wiper elements 108, 110 and cleaning element 112 have surfaces which are intended to engage the surface of glass as the blade 100 is passed back and forth across the glass surface during use. Each of the wiper elements 108 or 110 is somewhat triangular in cross section (as best seen in FIG. 9) having a glass-engaging tip and are integrally joined to the body of the spine portion 102 with a living hinge section 116 which permits the wiper elements 108, 110 to flex (i.e. hingedly move) rightwardly or leftwardly (as viewed in FIG. 9) relative to the spine portion 102 as the wiper elements 108, 110 are passed back and forth across a glass surface.

With reference still to FIG. 9, the cleaning element 112 includes a body 120 having a proximal end portion 122 which is substantially trapezoidal in shape to interfit with the groove 114, introduced above, in somewhat of a dove-tailed relationship so that the cleaning element 112 cannot be easily separated from the spine portion 102 if the cleaning element 112 were to be pulled directly downwardly (as viewed in FIG. 9) therefrom. Consequently, the cross-sectional shapes of the groove 114 and the proximal end portion 122 positioned within the groove 114 cooperate to retain the proximal end portion 112 within the groove 114 yet permit relative movement therebetween, as will be explained herein. An acceptable method for joining the cleaning element 112 to the spine portion 102 involves the insertion of the proximal end portion 122 of the cleaning element 112 endwise into the groove 114 of the spine portion 102.

The cleaning element 112 further includes a distal end portion 124 which is adapted to engage (and thereby clean and wipe) the surface of the glass as the wiper 100 is repeatedly passed back and forth across the glass. Although the distal end portion 124 of the cleaning element 124 can be comprised of any of a number of materials (such as a Nylon mesh) which is preferably non-absorbent (e.g. doesn't absorb water), the cleaning element 124 of the depicted wiper 100 is comprised of a plurality of bristles 126 which extend away from the spine portion 102 so as to be directed toward the glass surface intended to be wiped and cleaned by the wiper 100. The length of the bristles 126 are sized so that when the wiping elements 108, 110 are positioned in engagement with the glass surface to be cleaned with the blade 100, the bristles 126 engage the glass surface, as well.

Figure 10:
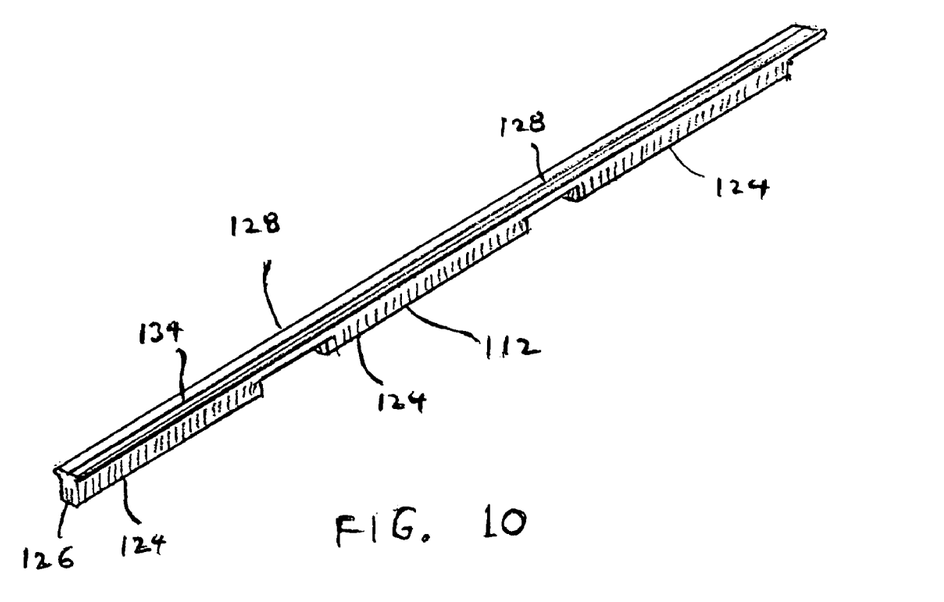
FIG. 10 is a fragmentary perspective view of the cleaning element of the FIG. 8 embodiment.

To help enable the cleaning element 112 to conform in shape to that of a curved glass surface (e.g. a windshield surface) across which the wiper blade 100 can be used, the distal end portion 124 of the cleaning element 112 is segmented as illustrated in FIG. 10. In particular, the distal end portion 124 of the cleaning element 112 is cut-away at regular intervals along the length of the element 112 leaving only short regions 128 of the proximal end portion 122 joining adjacent segments of the distal end portion 124 together. These short regions 128 of the proximal end portion 122 act as living hinges which permit adjacent segments of the distal end portion 124 (i.e. segments of like construction) to pivot relative to one another under the influence of the curvature of the glass surface across which the wiper blade 100 is passed.

It is a feature of the wiper 100 that the cleaning element 112 is permitted to move, or shift, longitudinally with respect to the wiping-providing body 101 and is also permitted to move, or shift, toward and away from the spine portion 102 as the wiper blade 100 is passed back and forth across a glass surface. To this end, the groove 114 provided within the spine portion 102 is sized so that its cross-sectional shape is slightly larger than that of the trapezoidal-shaped cross section of the proximal end portion 122 of the cleaning element 112 so that the cleaning element 124 is free to shift longitudinally of and toward and away from the spine portion 102 as desired.

Figure 11:
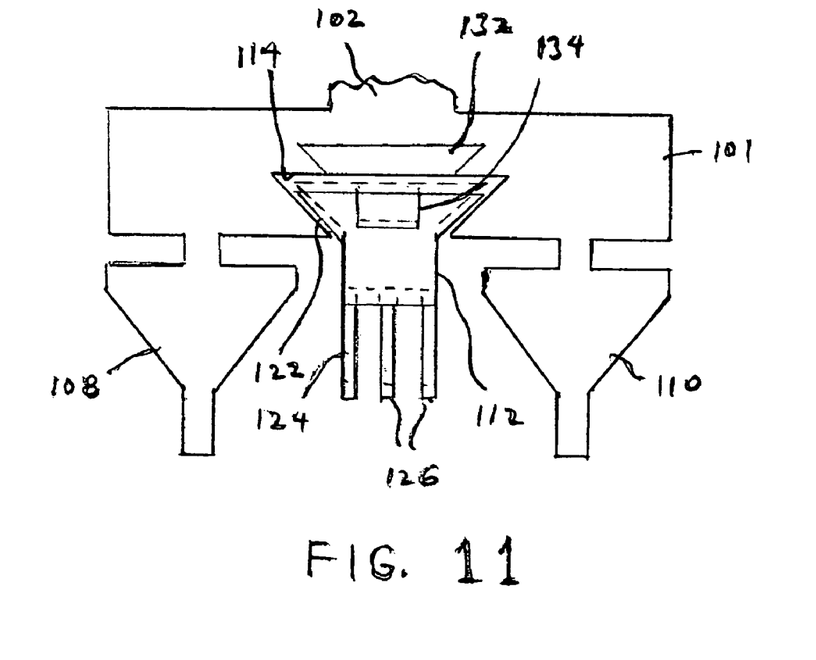
FIG. 11 is an end view of a fragment of the FIG. 8 embodiment.

It is also a feature of the embodiment 100 that it includes means, generally indicated 130, for biasing, or urging, the cleaning element 112 away from the spine portion 102 or, for example, from the position illustrated in phantom in FIG. 11 to the position illustrated in solid lines in FIG. 11. In this connection, the biasing means 130 includes a pair of juxtaposed magnetic devices 132, 134 which are joined, respectively, to the spine portion 102 and the cleaning element 112 so that the polarity of the magnetic devices oppose (rather than attract) one another. In other words, each magnetic device 132 or 134 is mounted within its corresponding spine portion 102 or cleaning element 112 so that when the cleaning element 112 is arranged within the groove 114, the magnetic flux emitted from like poles (i.e. North and North or South and South) of the magnetic devices 132, 134 urge the devices 132, 134—and thus the cleaning element 112 and spine portion 102—away from one another. More specifically and due to the repelling forces of the magnetic devices 132, 134 secured within the wiper 100, the cleaning element 112 is urged away from the spine portion 102 from the position illustrated in phantom in FIG. 11 toward the position illustrated in solid lines in FIG. 11.

To join each magnetic device 132 or 134 to a corresponding one of the spine portion 102 and the cleaning element 112, the spine portion 102 and the proximal end portion 122 of the cleaning element 112 have opposing (or facing) surfaces which is each formed with a cutout 136 or 138 therein, and each magnetic device 132 or 134 is snugly received by and secured within a corresponding one of the cutouts 132 or 134. As best seen in FIG. 9, the cross-sectional shape of each cutout 132 or 134 conforms generally to the cross-sectional shape of the magnetic device 132 or 134 to be accepted by the cutout 132 or 134 so that when positioned therein, each device 132 or 134 is closely accepted by the corresponding cutout 136 or 138. If desired, each device 132 or 134 can be fixedly secured within its corresponding cutout 136 or 138 with a suitable adhesive (e.g. glue) which is coated upon the (inside) surfaces of each cutout 136 or 138 before the magnetic devices 132 and 134 are positioned within its corresponding cutout 136 or 138.

Applicants have found that if the opposing surfaces of the juxtaposed magnetic devices 132, 134 are substantially of the same width, the magnetic devices 132 and 134 tend to shift traversely (i.e. leftwardly or rightwardly as viewed in FIG. 11) with respect to one another as opposed to remaining substantially centered with respect to one another—as is illustrated in FIG. 11. By providing one of the magnetic devices (e.g. the magnetic device 134) with a width (as measured transversely across the wiper blade 100) which is substantially smaller than (i.e. about one-third) that of the other magnetic device 132, this tendency for the magnetic devices 132 and 134 to shift rightwardly or leftwardly with respect to one another is substantially reduced.

During use of the wiper blade 100 (i.e. as the blade 100 is passed back and forth across the surface of glass desired to be cleaned with the blade 100), the repelling forces of the magnetic devices 132 and 134 continually urge the cleaning element 112 from the FIG. 11 phantom-line condition toward the FIG. 11 solid-line position. Consequently, forces which are exerted against the wiper blade 100 by the glass surface against which the blade 100 is positioned (and which urge the magnetic devices 132 and 134 toward one another) to effect a longitudinal shifting of the cleaning element 112 relative to the spine portion as the wiper blade 100 is passed back and forth across the glass surface. Therefore, the magnetic devices 132, 134 reduce the likelihood that the bristles 126 of the cleaning element 112 will trace exactly the same path as the blade 100 is passed back and forth across the glass surface to be cleaned and thereby effect a scrubbing of the glass surface by the cleaning element 112 as the wiper blade 100 is being used.

Figure 12:
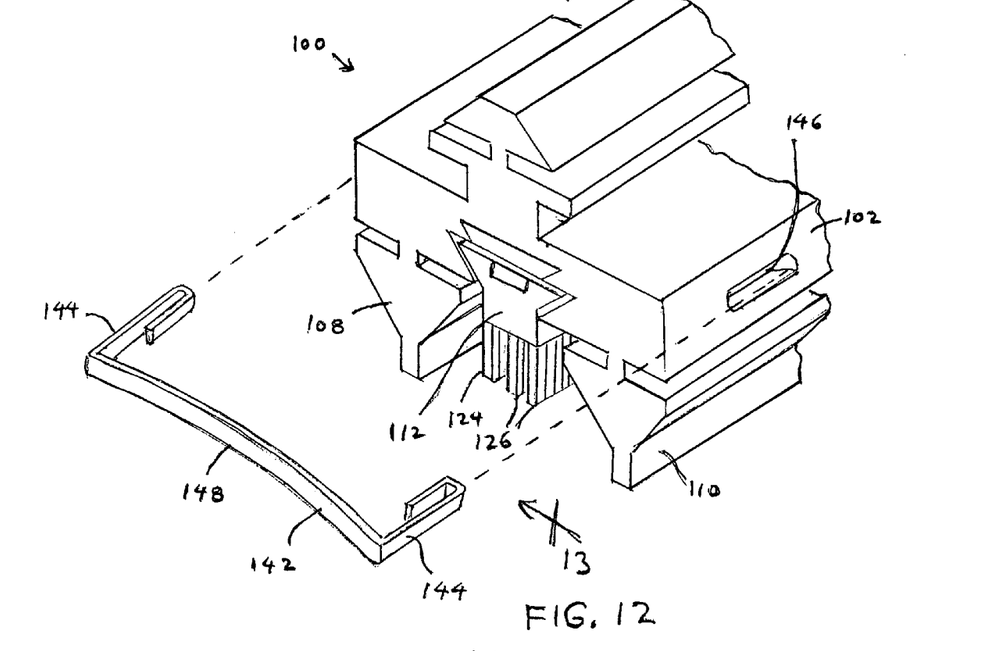
FIG. 12 is a fragmentary perspective view of an end of the FIG. 8 embodiment illustrating the retaining clip used thereat.
Figure 13:
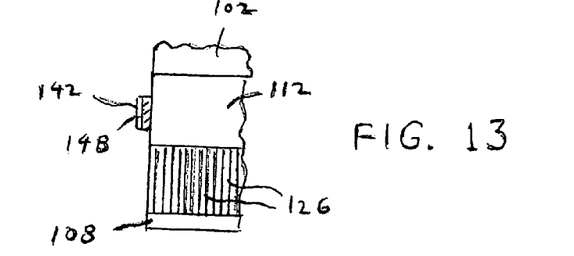
FIG. 13 is a cross-sectional view taken about along line 13—13 of FIG. 12.
Figure 14:
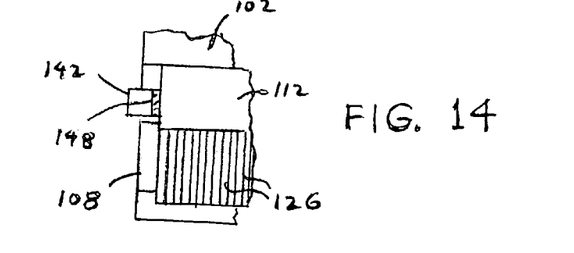
FIG. 14 is a view similar to that of FIG. 13 but illustrating an alternative position of the cleaning element relative to the spine portion of the embodiment.

With reference to FIG. 12, each end of the wiper blade 100 is provided with abutment means 140 for securing the cleaning element 112 within the groove 114 of the spine portion 102 and thereby preventing the cleaning element 112 from being inadvertently removed endwise from the spine portion 102. At each end of the depicted wiper blade 100, the abutment means 140 is provided by a U-shaped retainer clip 142 having two end portions 144 which are accepted by indentations 146 (only one shown in FIG. 12) provided along opposite sides of the spine portion 102 to thereby secure the retainer clip 142 to the spine portion 102 and a mid-section 148 which spans the end of the blade 100 to prevent the cleaning element 112 from inadvertently sliding out of the groove 114 provided in the spine portion 102. Furthermore, the mid-section 148 is resilient in nature (and comprised, for example, of spring steel) so that if the cleaning element 112 is urged longitudinally far enough out of the groove 114, the mid-section 148 urges the cleaning element 112 longitudinally inwardly along the groove 114 (i.e. inwardly with respect to the opposite ends of the spine portion 102). For example and with reference to FIGS. 13 and 14, if the cleaning element 112 is moved outwardly against the retainer clip 142 and against the opposing forces of the mid-section 148 to the position illustrated in FIG. 13, the mid-section 148 continually urges the cleaning element 112 back toward the position illustrated in FIG. 14.

It will be understood that numerous modifications and substitutions can be had to the aforedescribed embodiments without departing from the spirit of the invention. For example, although the embodiment 100 has been shown and described as including two magnetic devices 132, 134 for biasing the cleaning element 112 and the spine portion 102 apart, the cleaning element 112 can be constructed of an appropriate material and suitably magnetized to render the entire cleaning element a magnetic device which, which placed in juxtaposed relationship with the magnetic device secured within the wiper-providing body, biases the cleaning element and the spine portion apart. Accordingly, the aforedescribed embodiments are intended for the purpose of illustration and not as limitation.

The invention claimed is:

1. In a wiper blade having an elongated wiper-providing body including a spine portion and a wiping element extending from the spine portion for engaging and wiping glass as the wiper blade is moved thereacross and wherein the wiper-providing body includes a longitudinal axis, the improvement comprising:

an elongated cleaning element for cleaning the glass with the wiping element as the wiper blade is moved across the glass, the cleaning element being joined to the wiper-providing body to permit longitudinal movement of the cleaning element relative thereto and to permit movement of the cleaning element relative to the wiper-providing body toward and away from the spine portion as the wiper blade is moved across the glass; and a magnetic device joined to the wiper-providing body for biasing the cleaning element away from the spine portion of the wiper-providing body so that upon placing the wiping element and the cleaning element into engagement with the surface of the glass to be cleaned, the cleaning element is biased toward the glass surface by the forces of the magnetic device exerted upon the cleaning element and is maintained in a spaced relationship with the spine portion so that as the wiper blade is moved across the glass surface, the cleaning element is permitted to move relative to the wiper-providing element and the spine portion as aforesaid.

2. The improvement as defined in claim 1 wherein the wiper blade includes two wiper elements which are joined to and extend from the spine portion, and the spine portion defines a groove which is positioned between and extends along the two wiper elements, and the cleaning element includes a body having a proximal end portion which is positioned within the groove, and the groove and the proximal end portion of the cleaning element body are shaped so that the proximal end portion is captured by the groove yet permits the proximal end portion of the cleaning element to move within the groove relative to the wiper-providing body and the spine portion as aforesaid.

3. The improvement as defined in claim 2 wherein the groove of the spine portion and the proximal end portion of the cleaning element body have two surfaces which are positioned so as to face one another, the surface of the groove of the spine portion is provided with a cutout, and the magnetic device is secured within the cutout provided within the surface of the spine portion groove.

4. The improvement as defined in claim 1 wherein the magnetic device is a first magnetic device, and the improvement further includes a second magnetic device which is secured to the cleaning element and is arranged in juxtaposed relationship with the first magnetic device so that the like polarity of the two magnetic devices bias the magnetic devices apart so that upon placing the wiping element and the cleaning element into engagement with the surface of the glass to be cleaned, the cleaning element is biased toward the glass surface by the repelling forces of the two magnetic devices and is maintained in a spaced relationship with the spine portion so that as the wiper blade is moved across the glass surface, the cleaning element is permitted to move relative to the wiper-providing element and the spine portion as aforesaid.

5. The improvement as defined in claim 1 wherein the cleaning element includes a plurality of elongated cleaning segments of like construction which are joined to one another in an end-to-end fashion to facilitate the conformity of the cleaning elements to the shape of the glass surface as the wiper blade is moved thereacross.

6. In a wiper blade having an elongated wiper-providing body including a spine portion and a wiping element extending from the spine portion for engaging and wiping glass as the wiper blade is moved thereacross and wherein the wiper-providing body includes a longitudinal axis, the improvement comprising:

an elongated cleaning element for cleaning the glass with the wiping element as the wiper blade is moved across the glass, the cleaning element being joined to the wiper-providing body to permit longitudinal movement of the cleaning element relative thereto and to permit movement of the cleaning element relative to the wiper-providing body toward and away from the spine portion as the wiper blade is moved across the glass; and two magnetic devices wherein one magnetic device is joined to the cleaning element and the other magnetic device is joined to the spine portion of the wiper-providing body, and the two magnetic devices are in juxtaposed relationship with one another so that the like polarity of the two magnetic devices bias the magnetic devices apart so that upon placing the wiping element and the cleaning element into engagement with the surface of the glass to be cleaned, the cleaning element is biased toward the glass surface by the repelling forces of the two magnetic devices and is maintained in a spaced relationship with the spine portion so that as the wiper blade is moved across the glass surface, the cleaning element is permitted to move relative to the wiper-providing body and the spine portion as aforesaid.

7. The improvement as defined in claim 6 wherein the wiper blade includes two wiper elements which are joined to and extend from the spine portion, and the spine portion defines a groove which is positioned between and extends along the two wiper elements, and the cleaning element includes a body having a proximal end portion which is positioned within the groove, and the groove and the proximal end portion of the cleaning element body are shaped so that the proximal end portion is captured by the groove yet permits the proximal end portion of the cleaning element to move within the groove relative to the wiper-providing body and the spine portion as aforesaid.

8. The improvement as defined in claim 7 wherein the groove of the spine portion and the proximal end portion of the cleaning element body have two surfaces which are positioned so as to face one another, and each of the two surfaces is provided with a cutout, and the one magnetic device is secured within the cutout provided within the surface of the proximal end portion of the cleaning element body and the other magnetic device is secured within the cutout provided within the surface of the spine portion groove.

9. The improvement as defined in claim 8 wherein the two magnetic devices have surfaces which are arranged within the wiper blade so as to oppose one another within the wiper blade and which are biased apart by the repelling forces of the magnetic devices, and each of said surfaces of the magnetic devices has a width which is measured across the wiper blade, and the width of said surface of one magnetic device is smaller than the width of said surface of the other magnetic device.

10. The improvement as defined in claim 6 wherein the one magnetic device is fixedly secured to the cleaning element and the other magnetic device is fixedly secured to the spine portion so that as the one and the other magnetic devices are permitted to move relative to one another as the one and the other magnetic devices are biased apart, the cleaning element and the spine portion are permitted to move relative to one another by a corresponding amount.

11. The improvement as defined in claim 6 wherein the cleaning element includes a plurality of elongated cleaning segments of like construction which are joined to one another in an end-to-end fashion to facilitate the conformity of the cleaning elements to the shape of the glass surface as the wiper blade is moved thereacross.

12. The improvement as defined in claim 6 wherein the spine portion has two opposite ends, the cleaning element includes two opposite ends which substantially correspond with the two opposite ends of the spine portion, and the improvement further comprises means associated with the opposite ends of the spine portion for preventing the cleaning element from shifting longitudinally relative to the spine portion by a prescribed amount.

13. The improvement as defined in claim 12 wherein the associated means includes means for spring-biasing the cleaning element inwardly of the ends of the spine portion.

14. An elongated wiper blade attachable to the arm of a wiper blade assembly for cleaning the surface of glass in a vehicle as the blade is passed back and forth across the glass, the blade comprising:
   a wiper-providing body including a spine portion which extends along the length of the blade and which is adapted to be connected to the arm of a wiper blade, and the wiper-providing body further includes a wiping element which is joined to the spine portion for engaging the surface of glass when the wiper blade is moved thereacross;
   an elongated cleaning element for cleaning the glass with the wiping element as the wiper blade is moved across the glass, the cleaning element being joined to the wiper-providing body to permit longitudinal movement of the cleaning element relative thereto and to permit movement of the cleaning element relative to the wiper-providing body toward and away from the spine portion as the wiper blade is moved across the glass; and
   a magnetic device joined to the wiper-providing body for biasing the cleaning element away from the spine portion of the wiper-providing body so that upon placing the wiping element and the cleaning element into engagement with the surface of the glass to be cleaned, the cleaning element is biased toward the glass surface by the forces of the magnetic device exerted upon the cleaning element and is maintained in a spaced relationship with the spine portion so that as the wiper blade is moved across the glass surface, the cleaning element is permitted to move relative to the wiper-providing body and the spine portion as aforesaid.

15. The wiper blade as defined in claim 14 wherein the wiper blade includes two wiper elements which are joined to and extend from the spine portion, and the spine portion defines a groove which is positioned between and extends along the two wiper elements, and the cleaning element includes a body having a proximal end portion which is positioned within the groove, and the groove and the proximal end portion of the cleaning element body are shaped so that the proximal end portion is captured by the groove yet permits the proximal end portion of the cleaning element to move within the groove relative to the wiper-providing body and the spine portion as aforesaid.

16. The wiper blade as defined in claim 15 wherein the groove of the spine portion and the proximal end portion of the cleaning element body have two surfaces which are positioned so as to face one another, the surface of the groove of the spine portion is provided with a cutout, and the magnetic device is secured within the cutout provided within the surface of the spine portion groove.

17. The wiper blade as defined in claim 14 wherein the magnetic device is a first magnetic device, and the wiper blade further includes a second magnetic device which is secured to the cleaning element and is arranged in juxtaposed relationship with the first magnetic device so that the like polarity of the two magnetic devices bias the magnetic devices apart so that upon placing the wiping element and the cleaning element into engagement with the surface of the glass to be cleaned, the cleaning element is biased toward the glass surface by the repelling forces of the two magnetic devices and is maintained in a spaced relationship with the spine portion so that as the wiper blade is moved across the glass surface, the cleaning element is permitted to move relative to the wiper-providing body and the spine portion as aforesaid.

18. The wiper blade as defined in claim 14 wherein the cleaning element includes a plurality of elongated cleaning segments of like construction which are joined to one another in an end-to-end fashion to facilitate the conformity of the cleaning elements to the shape of the glass surface as the wiper blade is moved thereacross.

19. The wiper blade as defined in claim 14 wherein the spine portion has two opposite ends, the cleaning element includes two opposite ends which substantially correspond with the two opposite ends of the spine portion, and the wiper blade further comprises means associated with the opposite ends of the spine portion for preventing the cleaning element from shifting longitudinally relative to the spine portion by a prescribed amount.

20. The wiper blade as defined in claim 19 wherein the associated means includes means for spring-biasing the cleaning element inwardly of the ends of the spine portion.

* * * * *